US009820136B2

(12) United States Patent
Naito et al.

(10) Patent No.: US 9,820,136 B2
(45) Date of Patent: *Nov. 14, 2017

(54) WIRELESS COMMUNICATION DEVICE, WIRELESS COMMUNICATION SYSTEM, WIRELESS COMMUNICATION METHOD AND PROGRAM

(71) Applicant: SONY CORPORATION, Tokyo (JP)

(72) Inventors: Masahiko Naito, Tokyo (JP); Katsutoshi Itoh, Tokyo (JP); Osamu Yoshimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/286,004

(22) Filed: Oct. 5, 2016

(65) Prior Publication Data

US 2017/0026821 A1 Jan. 26, 2017

Related U.S. Application Data

(63) Continuation of application No. 14/593,197, filed on Jan. 9, 2015, now Pat. No. 9,491,608, which is a (Continued)

(30) Foreign Application Priority Data

Apr. 6, 2009 (JP) ................. 2009-092402

(51) Int. Cl.
*H04W 4/00* (2009.01)
*H04W 8/00* (2009.01)
(Continued)

(52) U.S. Cl.
CPC ......... *H04W 8/005* (2013.01); *H04W 40/244* (2013.01); *H04W 84/20* (2013.01); *H04W 84/12* (2013.01)

(58) Field of Classification Search
CPC .... H04W 8/0005; H04W 84/20; H04W 84/12
See application file for complete search history.

(56) References Cited

U.S. PATENT DOCUMENTS

| 6,178,323 B1 | 1/2001 | Nagata |
| 6,901,275 B1 | 5/2005 | Aoyagi |

(Continued)

FOREIGN PATENT DOCUMENTS

| CN | 1714594 | 12/2005 |
| CN | 101083610 | 12/2007 |

(Continued)

OTHER PUBLICATIONS

Apr. 28, 2016, European Office Action for related EP Application No. 15158470.3.

(Continued)

*Primary Examiner* — Afshawn Towfighi
(74) *Attorney, Agent, or Firm* — Paratus Law Group, PLLC

(57) ABSTRACT

Provided is a wireless communication device which includes a function information transmitting unit for transmitting, via a wireless communication network, function information relating to a function of the wireless communication device, a function information receiving unit for receiving function information transmitted from another device, a function information comparison unit for comparing the function information of the wireless communication device and the function information received from such other device, and a function determination unit for determining which of the wireless communication device and such other device is to play a function of an access point, based on a result of the comparison by the function information comparison unit.

8 Claims, 9 Drawing Sheets

Related U.S. Application Data continuation of application No. 12/748,263, filed on Mar. 26, 2010, now Pat. No. 8,934,464.

(51) Int. Cl.
*H04W 40/24* (2009.01)
*H04W 84/20* (2009.01)
*H04W 84/12* (2009.01)

(56) References Cited

U.S. PATENT DOCUMENTS

| | | | |
|---|---|---|---|
| 7,882,196 B2* | 2/2011 | Fujii | H04W 28/18 709/204 |
| 9,491,608 B2* | 11/2016 | Naito | H04W 84/20 |
| 2005/0075084 A1* | 4/2005 | Salokannel | H04L 45/00 455/126 |
| 2005/0243795 A1 | 11/2005 | Kim et al. | |
| 2007/0001853 A1 | 1/2007 | Otranen | |
| 2007/0201382 A1 | 8/2007 | Ekl et al. | |
| 2008/0044024 A1 | 2/2008 | Oh et al. | |

FOREIGN PATENT DOCUMENTS

| | | |
|---|---|---|
| CN | 101335673 | 12/2008 |
| EP | 1718028 A1 | 11/2006 |
| GB | 2416624 A | 2/2006 |
| GB | 2416642 A | 2/2006 |
| JP | 2003-526251 | 9/2003 |
| JP | 2004-129042 | 4/2004 |
| JP | 2005-033285 | 2/2005 |
| JP | 2006-235989 | 9/2006 |
| JP | 2006-311138 | 11/2006 |
| JP | 2006-526932 | 11/2006 |
| JP | 2007-074561 | 3/2007 |
| JP | 2007-081811 | 3/2007 |
| JP | 2007-150712 | 6/2007 |
| JP | 2008-023590 | 2/2008 |
| JP | 2008-523697 | 7/2008 |
| JP | 2008-236590 | 10/2008 |
| JP | 2008-283590 | 11/2008 |
| WO | WO2004/109996 A1 | 12/2004 |
| WO | WO2005/034434 | 4/2005 |
| WO | WO 2005/034434 A1 | 4/2005 |

OTHER PUBLICATIONS

IEEE Computer Society, "Part 15.3: Wireless Medium Access Control (MAC) and Physical Layer (PHY) Specification for High Rate Wireless Personal Area Networks (WPANs)", IEEE Std 802.15.3, Sep. 29, 2003, pp. i-315, The Institute of Electrical and Electronics Engineers, Inc.
Brenner, "A Technical Tutorial on the IEEE 802.11 Protocol", Jul. 18, 1996, pp. 1-24, BreezeCOM.
May 18, 2015, EP communication issued for related EP application No. 15158470.3.
Jun. 22, 2015, EP communication issued for related EP application No. 10250203.6.
May 26, 2015, JP communication issued for related JP application No. 2014-035818.
Nov. 11, 2014, JP communication issued for related JP application No. 2014-035818.
Nov. 26, 2013, Japanese Office Action issued for related JP application No. 2009-092402.
Mar. 14, 2014, Extended European Search Report for related EP application No. 10250203.6.
Apr. 23, 2013, Japanese Office Action issued for related application No. JP2009-092402.
Jun. 20, 2013, CN communication issued for related CN application No. 201010139871.3.
Nov. 8, 2016, JP communication issued for related JP application No. 2015-166901.
Mar. 21, 2017, JP communication issued for related JP application No. 2015-166901.
Jul. 4, 2017, EP communication issued for related EP application No. 17162644.3.
Jul. 28, 2017, JP communication issued for JP related application No. 2015-166901.

* cited by examiner

FIG.2

| ITEM | STA1 | STA2 |
|---|---|---|
| AC POWER IS CONNECTED? | YES | NO |
| REMAINING BATTERY AMOUNT | 60% | 80% |
| MAXIMUM COMMUNICATION SPEED | 300Mbps | 54Mbps |
| NUMBER OF USABLE FREQUENCY CHANNELS | 24 CHANNELS | 20 CHANNELS |
| BRIDGE FUNCTION IS IMPLEMENTED? | YES | NO |
| SUPPORTED ENCODING METHOD | WEP,TKIP,AES | TKIP,AES |
| CPU PROCESSING CAPACITY | 1 | 0 |
| DISPLAY IS PROVIDED? | YES | NO |
| INPUT DEVICE | 2(KEYBOARD) | 1(PUSH BUTTON) |

FIG.3

| ITEM | WEIGHT |
|---|---|
| AC POWER IS CONNECTED | 3 |
| FASTER MAXIMUM COMMUNICATION SPEED | 2 |
| MORE USABLE FREQUENCY CHANNELS | 1 |
| BRIDGE FUNCTION IS IMPLEMENTED | 3 |
| MORE SUPPORTED ENCODING METHODS | 1 |
| HIGHER CPU PROCESSING CAPACITY | 1 |
| DISPLAY IS PROVIDED | 2 |

FIG.4

| REMAINING BATTERY AMOUNT | WEIGHT |
|---|---|
| 100%~75% | 3 |
| 74%~50% | 2 |
| 49%~25% | 1 |
| 24%~0% | 0 |

FIG.5

| INPUT DEVICE | WEIGHT |
|---|---|
| NONE | 0 |
| WITH PUSH BUTTON | 1 |
| WITH KEYBOARD | 2 |

FIG.6

| ITEM | STA1 | STA2 |
|---|---|---|
| AC POWER IS CONNECTED? | 3 | 0 |
| REMAINING BATTERY AMOUNT | 2 | 3 |
| MAXIMUM COMMUNICATION SPEED | 1 | 0 |
| NUMBER OF USABLE FREQUENCY CHANNELS | 1 | 0 |
| BRIDGE FUNCTION IS IMPLEMENTED? | 2 | 0 |
| SUPPORTED ENCODING METHOD | 1 | 0 |
| CPU PROCESSING CAPACITY | 1 | 0 |
| DISPLAY IS PROVIDED? | 2 | 0 |
| QUALITY OF INPUT DEVICE | 2 | 1 |
| TOTAL | 15 | 4 |

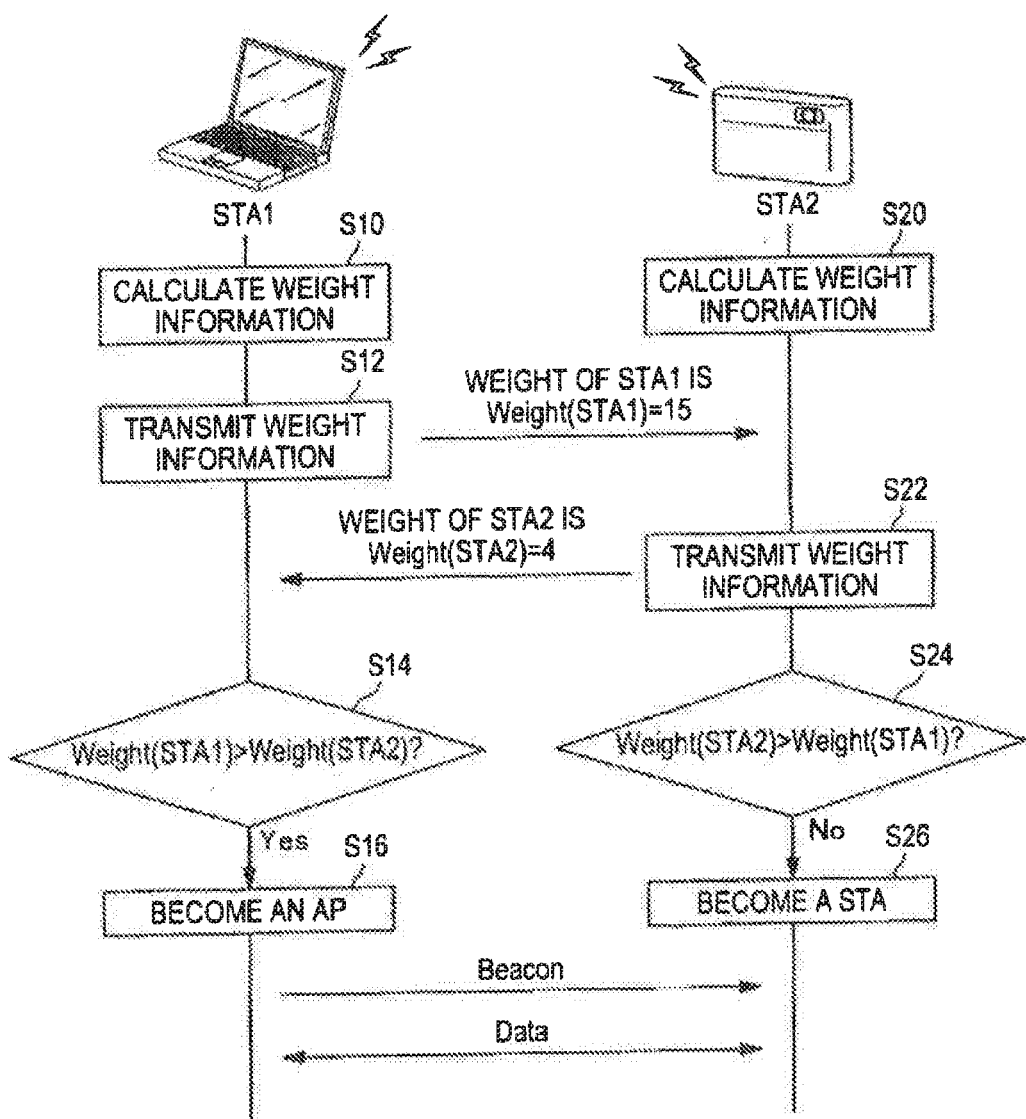

FIG.8

| ITEM | STA3 | STA4 |
|---|---|---|
| AC POWER IS CONNECTED? | NO | NO |
| REMAINING BATTERY AMOUNT | 60% | 40% |
| MAXIMUM COMMUNICATION SPEED | 300Mbps | 54Mbps |
| NUMBER OF USABLE FREQUENCY CHANNELS | 24 CHANNELS | 20 CHANNELS |
| BRIDGE FUNCTION IS IMPLEMENTED? | YES | NO |
| SUPPORTED ENCODING METHOD | WEP,TKIP,AES | TKIP,AES |
| CPU PROCESSING CAPACITY | 1 | 0 |
| DISPLAY IS PROVIDED? | YES | NO |
| INPUT DEVICE | 2(KEYBOARD) | 1(PUSH BUTTON) |

FIG.9

| PRIORITY | ITEM |
|---|---|
| 1 | AC POWER IS CONNECTED |
| 2 | BRIDGE FUNCTION IS IMPLEMENTED |
| 3 | LARGER REMAINING BATTERY AMOUNT |
| 4 | FASTER MAXIMUM COMMUNICATION SPEED |
| 5 | MORE USABLE FREQUENCY CHANNELS |
| 6 | SUPPORTED ENCODING METHOD |
| 7 | CPU PROCESSING CAPACITY |
| 8 | DISPLAY IS PROVIDED |
| 9 | QUALITY OF INPUT DEVICE |

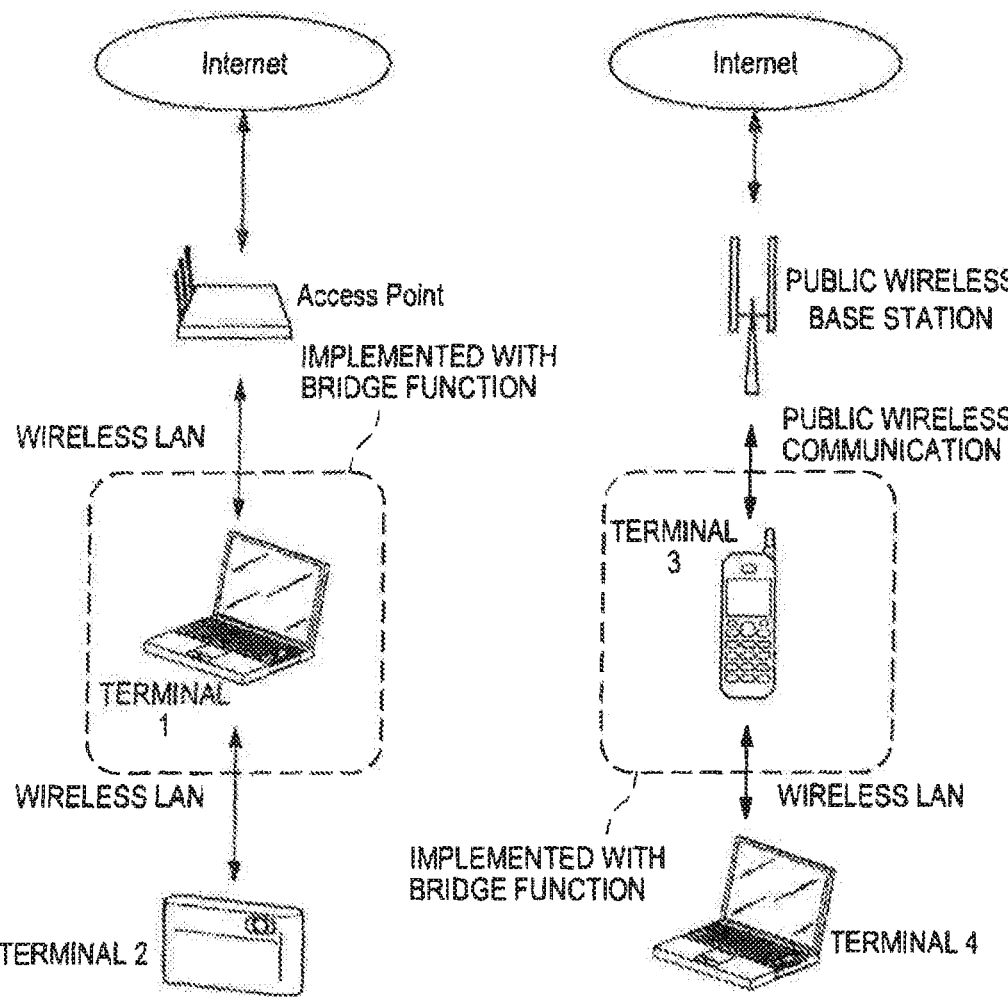
FIG.11A
FIG.11B
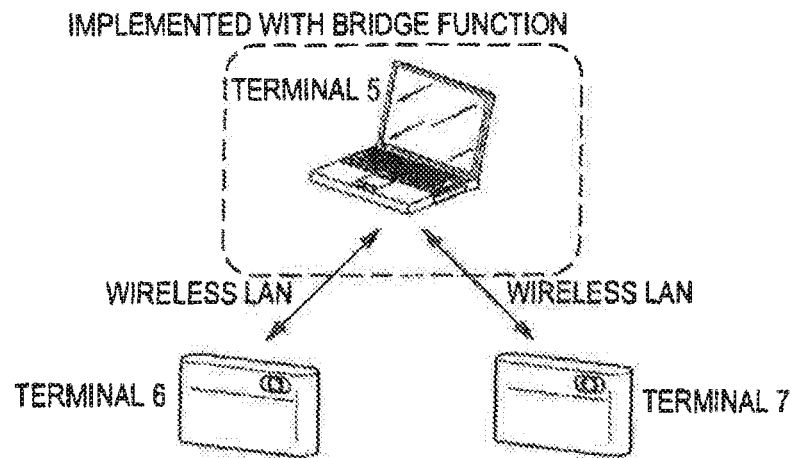
FIG.11C

WIRELESS COMMUNICATION DEVICE, WIRELESS COMMUNICATION SYSTEM, WIRELESS COMMUNICATION METHOD AND PROGRAM

CROSS-REFERENCE TO PRIOR APPLICATION

This application is a continuation of U.S. patent application Ser. No. 14/593,197 (filed on Jan. 9, 2015), which is a continuation of U.S. patent application Ser. No. 12/748,263 (filed on Mar. 26, 2010 and issued as U.S. Pat. No. 8,934,464 on Jan. 13, 2015), which claims priority to Japanese Patent Application No. 2009-092402 (filed on Apr. 6, 2009), which are all hereby incorporated by reference in their entirety.

BACKGROUND OF THE INVENTION

Field of the Invention

The present invention relates to a wireless communication device, a wireless communication system, a wireless communication method, and a program.

Description of the Related Art

In recent years, due to advantages such as a greater degree of freedom of devices or the like, a wireless network typified by IEEE 802.11, which is a LAN standard, is becoming more popular, taking the place of a wired network, and applications that are used are becoming more varied.

CITATION LIST

Patent Literature

[Patent Literature 1] JP-A-2008-283590
[Patent Literature 2] JP-T-2008-523697
[Patent Literature 3] JP-A-2007-74561

SUMMARY OF THE INVENTION

In the infrastructure mode of IEEE 802.11, the operation of an access point (AP) is started first, and notification information (beacon) is periodically transmitted from the access point at a frequency that is set in advance. A station (STA) finds the access point, which is a communication counterpart, by receiving the beacon transmitted from the access point.

On the other hand, a method is assumed of determining an access point and a station by negotiation after connection has been completed, without distinguishing in advance an access point and a station among communicating devices. According to this method, since it is not known at what frequency the counterpart is operating, notifications, such as beacons, are transmitted while switching the frequencies, and when the frequencies of devices match at a certain timing, the notification information can be received for the first time and connection can be completed.

However, in this case, which device will be the access point has to be determined for sure at the time of negotiation, before the transmission/reception of data between the connected devices.

In light of the foregoing, it is desirable to provide a wireless communication device, a wireless communication system, a wireless communication method, and a program which are novel and improved, and which enable to determine for sure which device will play the role of an access point by negotiation at the time of connection.

According to an embodiment of the present invention, there is provided a wireless communication device which includes a function information transmitting unit for transmitting, via a wireless communication network, function information relating to a function of the wireless communication device, a function information receiving unit for receiving function information transmitted from another device, a function information comparison unit for comparing the function information of the wireless communication device and the function information received from such other device, and a function determination unit for determining which of the wireless communication device and such other device is to play a function of an access point, based on a result of the comparison by the function information comparison unit.

The function information transmitting unit may transmit, as the function information relating to the function of the wireless communication device, a weight for the function of the wireless communication device. The function information receiving unit may receive, as the function information transmitted from such other device, a weight for the function of such other device. The function information comparison unit may compare the respective weights for the wireless communication device and such other device.

The function information transmitting unit may transmit, as the function information relating to the function of the wireless communication device, accumulated value of the weight of each function of the wireless communication device. The function information receiving unit may receive, as the function information transmitted from such other device, accumulated value of the weight of each function of such other device. The function information comparison unit may compare the respective accumulated values of the weights for the wireless communication device and such other device.

A storage unit for storing priority relating to the function information may be included. The function information comparison unit may compare pieces of the function information based on the priority.

The function information may be information relating to at least one of connection/non-connection of AC power, a remaining battery amount, a maximum communication speed, a number of usable frequency channels, presence or absence of a bridge function, a supported encoding method, a CPU processing capacity, presence or absence of a display, and a function of an input device.

The function information may change flexibly depending on a current state of the wireless communication device or such other device.

A weight calculation unit for calculating the weight for each function of such other device based on the function information transmitted from such other device may be included. The function information comparison unit may compare the weight for each function of the wireless communication device and the weight for each function of such other device.

According to another embodiment of the present invention, there is provided a wireless communication system which includes a first wireless communication device including a function information transmitting unit for transmitting to a second wireless communication device, via a wireless communication network, function information relating to a function of the first wireless communication device, a function information receiving unit for receiving function information transmitted from the second wireless communication device, a function information comparison unit for comparing the function information of the first wireless communication device and the function information received from the second wireless communication device, and a function determination unit for determining which of the first wireless communication device and the second wireless communication device is to play a function of an access point, based on a result of the comparison by the function information comparison unit, and the second wireless communication device including a function information transmitting unit for transmitting to the first wireless communication device, via the wireless communication network, the function information relating to the function of the second wireless communication device, a function information receiving unit for receiving the function information transmitted from the first wireless communication device, a function information comparison unit for comparing the function information of the second wireless communication device and the function information received from the first wireless communication device, and a function determination unit for determining which of the second wireless communication device and the first wireless communication device is to play the function of the access point, based on a result of the comparison by the function information comparison unit.

According to another embodiment of the present invention, there is provided a wireless communication method which includes the steps of transmitting, via a wireless communication network, function information relating to a function of a wireless communication device, receiving function information transmitted from another device;

comparing the function information of the wireless communication device and the function information received from such other device, and determining which of the wireless communication device and such other device is to play a function of an access point, based on a result of the comparison.

According to another embodiment of the present invention, there is provided a program for causing a computer to function as means for transmitting, via a wireless communication network, function information relating to a function of a wireless communication device, means for receiving function information transmitted from another device, means for comparing the function information of the wireless communication device and the function information received from such other device, and means for determining which of the wireless communication device and such other device is to play a function of an access point, based on a result of the comparison.

According to the embodiments of the present invention described above, which device will play the role of an access point can be determined for sure by negotiation at the time of connection

BRIEF DESCRIPTION OF THE DRAWINGS

FIG. 2 is a schematic diagram showing functions of a station 1 (STA1) and a station 2 (STA2);

FIG. 3 is a schematic diagram showing an example of a weight for having each function of FIG. 2;

FIG. 4 is a schematic diagram showing weight changing depending of remaining battery amount;

FIG. 5 is a schematic diagram showing weight changing depending on the capacity of an input device (a user interface);

FIG. 6 is a schematic diagram showing the result of calculation of the weights based on FIGS. 3 to 5, for each of the station 1 and the station 2 shown in FIG. 2;

FIG. 7 is a sequence diagram showing a flow of determining, in case the station 1 (STA1) and the station 2 (STA2) shown in FIG. 2 start communication, which device is to operate as an access point;

FIG. 8 is a schematic diagram showing functions of a station 3 and a station 4;

FIG. 9 is a schematic diagram showing the order of priorities for becoming an access point, decided based on the functions shown in FIG. 8;

FIGS. 11A to 11C are schematic diagrams for describing a bridge function; and

DETAILED DESCRIPTION OF THE EMBODIMENT(S)

Figure 1:
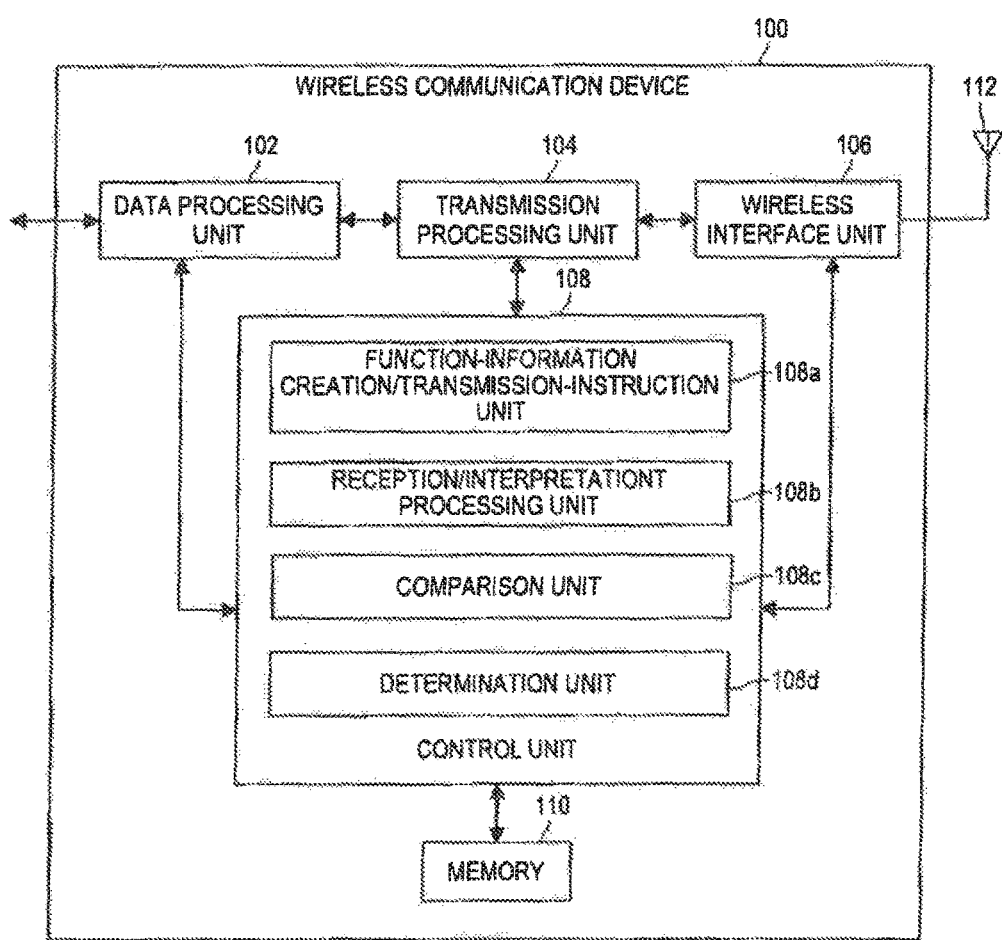
FIG. 1 is a block diagram showing an example of the configuration of a wireless communication device according to each embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be given in the following order.
<1. First Embodiment>
(1) Technical Basis
(2) Configuration of Wireless Communication Device
(3) Flow of Processes according to First Embodiment
<2. Second Embodiment>
(1) Flow of Processes according to Second Embodiment
(2) Bridge Function
(3) Configuration Example of Information Processing Apparatus with Built-In Wireless Communication Device 1. First Embodiment (1) Technical Basis Most of the wireless LAN connection modes defined by IEEE 802.11, which is a wireless LAN standard, are an infrastructure mode of performing communication via an access point. At the time of connecting wirelessly, a radio has to somehow find a connection counterpart. To find here means to be in a state where synchronization of frequency channels and timings can be established.

In the infrastructure mode of IEEE 802.11, the operation of an access point (AP) is started first, and a beacon is periodically transmitted at a frequency (referred to as F1) that is set in advance. Here, the beacon is notification information including an ESS-ID, which is an identifier of a network, or the like. A station (STA) finds the access point, which is a communication counterpart, by receiving the beacon transmitted from the access point. At this time, the frequency of the station (STA) may be set by a user to be the same as the frequency F1 of the access point (AP), or the station may continue reception while switching the frequency channels defined by IEEE 802.11 one by one until the station detects the beacon.

In the infrastructure mode, which device is an access point and which device is a station are determined at the time of manufacturing the devices, and a user selects an access point or a station at the time of purchase. Alternatively, the user sets a device to be an access point or a station after purchasing a device.

On the other hand, a method can be assumed according to which two terminals are connected one-to-one in a simple manner by using the mechanism of IEEE 802.11 wireless LAN without the user consciously distinguishing between an access point and a station. According to this method, the terminals are equal to each other without the distinction of access point and station, and at the time of communication, both start searching for each other at the same time. Negotiation is performed after each other is found, and one plays the role of a simple access point, and the other plays the role of a station. Accordingly, this method enables to realize a simple infrastructure mode without distinguishing between an access point and a station.

According to the method described above, the user specifies only the devices for performing communication without specifying in advance which device is to be the access point or the station, and the devices perform negotiation and one of the devices autonomously takes the role of the access point. Thus, a rule becomes necessary for determining at the time of negotiation which device is to be the access point.

According to the present embodiment, which terminal is to be the access point is autonomously determined by the devices, and an evaluation method and evaluation items for the autonomous determination are decided. In the present embodiment, which device is to take the role of the access point is determined, at the time of negotiation, based on the function information of each terminal (weights of functions, or the like) and the order of priority thereof. Hereunder, the present embodiment will be described in detail.

(2) Configuration of Wireless Communication Device

FIG. 1 is a block diagram showing an example of the configuration of a wireless communication device 100 according to each embodiment of the present invention. The wireless communication device 100 is configured to be able to communicate with other wireless communication device by a wireless communication network such as IEEE 802.11a, IEEE 802.11b and IEEE 802.11n, which are wireless LAN standards. As shown in FIG. 1, each wireless communication device 100 includes a data processing unit 102, a transmission processing unit 104, a wireless interface unit 106, a control unit 108, a memory 110, and an antenna 112.

At the time of transmission, the data processing unit 102 creates various data frames and data packets in response to a request from an upper layer, for example, and supplies the same to the transmission processing unit 104. The transmission processing unit 104 performs, at the time of transmission, processing such as adding to a packet generated at the data processing unit 102 various data heads or an error detection code such as a frame check sequence (FCS), and provides the data which has been processed to the wireless interface unit 106. The wireless interface unit 106 generates, from the data received from the transmission processing unit 104, a modulation signal in a frequency band of a carrier, and makes the same transmitted from the antenna 112 as a radio signal.

Furthermore, at the time of performing a reception operation, the wireless interface unit 106 decodes the various data frames by down-converting the radio signal received by the antenna 112 and changing the same to a bit sequence. That is, the wireless interface unit 106 can function, in cooperation with the antenna 112, as a transmitting unit and a receiving unit. The transmission processing unit 104 analyzes the headers added to the various data frames supplied from the wireless interface unit 106 and checks, based on the error detection code, that each data frame includes no error, and then, supplies the various data frames to the data processing unit 102. The data processing unit 102 processes and analyzes the various data frames and data packets supplied from the transmission processing unit 104.

The control unit 108 is a block for controlling the respective operations of the data processing unit 102, the transmission processing unit 104, and the wireless interface unit 106, and the control unit 108 can perform operations such as determination of a transmission/reception frequency, creation of a control message (notification information such as a beacon, a beacon acknowledgement, a probe request and a probe response), issuance of a transmission command for the control message, and interpretation of the control message, and the control unit 108 controls various operations of the wireless communication device 100, such as reception operation and transmission operation. Furthermore, the control unit 108 creates a control message including function information such as weight information of the present embodiment, and interprets the control message, for example.

As shown in FIG. 1, the control unit 108 includes, as main structural elements, a function-information creation/transmission-instruction unit 108a, a reception/interpretation processing unit 108b, a comparison unit 108c, and a determination unit 108d. The function-information creation/transmission-instruction unit 108a creates the control message including function information such as weight, or issues a transmission command for the control message. The reception/interpretation processing unit 108b performs a reception process or an interpretation process for the control message including the function information transmitted from the communication counterpart. The comparison unit 108c compares the function information of the self device (the device to which the unit in question belongs) and the function information transmitted from the communication counterpart. The determination unit 108d performs an operation of determining, based on the comparison result by the comparison unit 108c, which of the self device and the communication counterpart is to take the role of the access point or of the station.

The memory 110 plays the role of a work area for the data processing by the control unit 108, and has a function of a storage medium for holding various types of data. Various storage media, for example, a volatile memory such as a DRAM, a non-volatile memory such as an EEPROM, a hard disk and an optical disk, may be used as the memory 110. Additionally, each block shown in FIG. 1 can be configured from hardware (circuit). Furthermore, each block can be configured from a processor (CPU) and software (program) for making the processor function. In this case, the program can be stored in the storage medium included in the wireless communication device 100, such as the memory 10.

(3) Flow of Processes According to First Embodiment

Hereunder, a detailed explanation will be given on a method of determining, by negotiation, which device is to be the access point in case a station 1 and a station 2 communicate with each other. Both station 1 and station 2 are assumed to have a function conforming to IEEE 802.11. FIG. 2 is a schematic diagram showing the functions of the station 1 (STA1) and the station 2 (STA2).

As shown in FIG. 2, the station 1 and the station 2 have a specific function in relation to each of the items "AC power is connected?," "remaining battery amount," "maximum communication speed," "number of usable frequency channels," "bridge function is implemented?," "supported encoding method," "CPU processing capacity," "display is provided?," and "input device." The station 1 and the station 2 differ from each other in function for each item. In the present embodiment, weights are set depending on these functions.

FIG. 3 is a schematic diagram showing examples of the weight to be given to each function shown in FIG. 2. As shown in FIG. 3, in case AC power is connected, the weight is "3." In case the maximum communication speed is faster, the weight is "2." In case the number of usable frequency channels is larger, the weight is "1." In case a bridge function is implemented, the weight is "3." In case the number of supported encoding methods is larger, the weight is "1." In case the processing capacity of the CPU is higher, the weight is "1." Also, in case a display is provided, the weight is "2." In the present embodiment, the higher the weight, the more suited as an access point it is determined to be, and thus it tends to become the access point at the time of negotiation.

Additionally, the method of quantifying the CPU processing capacity is not particularly limited. For example, the weight given to a device can be set to "1" in case the manufacturer (maker) of the device decides that the device has sufficient CPU processing capacity for operating as an access point. Also, in case the manufacturer of a device decides that the device does not have sufficient CPU processing capacity for operating as an access point, the weight given to the device can be set to "0."

Among the functions shown in FIG. 2, the weights relating to the items "remaining battery amount" and "input device" are flexibly changed depending on their levels. FIG. 4 is a schematic diagram showing weight changing depending on the remaining battery amount. Regarding the remaining battery amount among the functions shown in FIG. 2, the weight is set depending on the remaining amount. As shown in FIG. 4, when the remaining battery amount is 100% to 75%, the weight is 3; and when it is 74% to 50%, the weight is 2. Also, when the remaining battery amount is 49% to 25%, the weight is 1; and when it is 24% to 0%, the weight is 0.

FIG. 5 is a schematic diagram showing weight changing depending on the ability of an input device (user interface). Among the functions shown in FIG. 2, the weight is set for the ability of an input device depending on the ability, and a device having a higher performing user interface is made to be the access point. As shown in FIG. 5, when an input device is not included, the weight is 0; when a push button is included as the input device, the weight is 1; and when a keyboard is included as the input device; the weight is 2.

FIG. 6 is a schematic diagram showing the result of calculating, the weights for each of the station 1 and the station 2 shown in FIG. 2, based on FIGS. 3 to 5. When the weights are determined in accordance with FIGS. 3 to 5 for the functions of the station 1 and the station 2 shown in FIG. 2, the result shown in FIG. 6 is obtained where the weight of the station 1 (Weight(STA1)) is "15" and the weight of the station 2 (Weight(STA2)) is "4."

FIG. 7 is a sequence diagram showing the flow of determining, in case the station 1 (STA1) and the station 2 (STA2) shown in FIG. 2 start communication, which device is to operate as the access point. First, in steps S10 and S20, calculation of the weight information is performed at each of the station 1 and the station 2. In step S10, the station 1 calculates the weight (Weight(STA1)) of itself; and in step S20, the station 2 calculates the weight (Weight(STA2)) of itself.

Next, in step S12, the station 1 transmits the weight of itself, Weight(STA1)=15, to the station 2. Also, in step S22, the station 2 transmits the weight of itself, Weight(STA2))=4, to the station 1. Additionally, although each device transmits the accumulated value of the weights, it is also possible to obtain and transmit a weight only of a specific function. Furthermore, the information to be transmitted to another station does not have to be the weight, and may be the information itself on the functions as shown in FIG. 2, for example. In that case, calculation of the weight of a station, which is the communication counterpart, is performed by a station which has received the function information. The calculation of the weight can be performed at the function-information creation/transmission-instruction unit 108a, and the function-information creation/transmission-instruction 108a functions as a weight calculation unit.

The station 1 compares, in the next step S14, the weight Weight(STA1) of itself and the weight Weight(STA2)=4 received from the station 2, and decides whether Weight (STA1) is larger than Weight(STA2). In the example shown in FIG. 7, since the weight of the station 1 is larger than the weight of the station 2, the process proceeds to step S16 and the station 1 is determined to be an access point.

Also, the station 2 compares, in step S24, the weight Weight(STA2) of itself and the weight Weight(STA1) received from the station 1, and decides whether Weight (STA2) is larger than Weight(STA1). In the example shown in FIG. 7, since Weight(STA2) is equal to or smaller than Weight(STA1) and the weight of the station 2 is smaller than the weight of the station 1, the process proceeds to step S26 and the station 2 is determined to be a station in the infrastructure mode.

The station 1 will function as an access point after step S16, and thus it will transmit a beacon. On the other hand, the station 2 will function as a station in the infrastructure mode after step S26, and thus it will receive the beacon transmitted from the station 1 and will transmit data to the station 1.

Additionally, in case Weight(STA1) is equal to or smaller than Weight(STA2) in step S14 and Weight(STA2) is larger than Weight(STA1) in step S24, the station 2 will be an access point in step S16. Also, the station 1 will be a station in the infrastructure mode in step S26. In this case, after step S26, the station 2 will transmit a beacon and the station 1 will transmit data to the station 2.

As described above, according to the process shown in FIG. 7, which device is to be an access point is determined by negotiation using the weights. Accordingly, a device showing higher suitability for an access point can be determined to be the access point, based on the functions of each device.

As described above, according to the first embodiment, which of the devices performing one-to-one communication will be an access point can be determined by setting a weight in accordance with the functions of each station.

2. Second Embodiment (1) Flow of Processes According to Second Embodiment

Next, the second embodiment of the present invention will be described. The second embodiment is for determining whether a device is to be an access point or a station, according to the priorities assigned to the functions of each station.

Here, communication is assumed to be performed by a station 3 and a station 4. As with the first embodiment, the station 3 and the station 4 are both assumed to have functions conforming to IEEE 802.11. FIG. 8 is a schematic diagram showing the functions of the station 3 and the station 4.

Also, FIG. 9 is a schematic diagram showing the order of priorities for becoming an access point, decided based on the functions shown in FIG. 8. The information shown in FIG. 9 is acquired in advance by each station as shared information, and is stored in the memory 110, for example.

Figure 10:
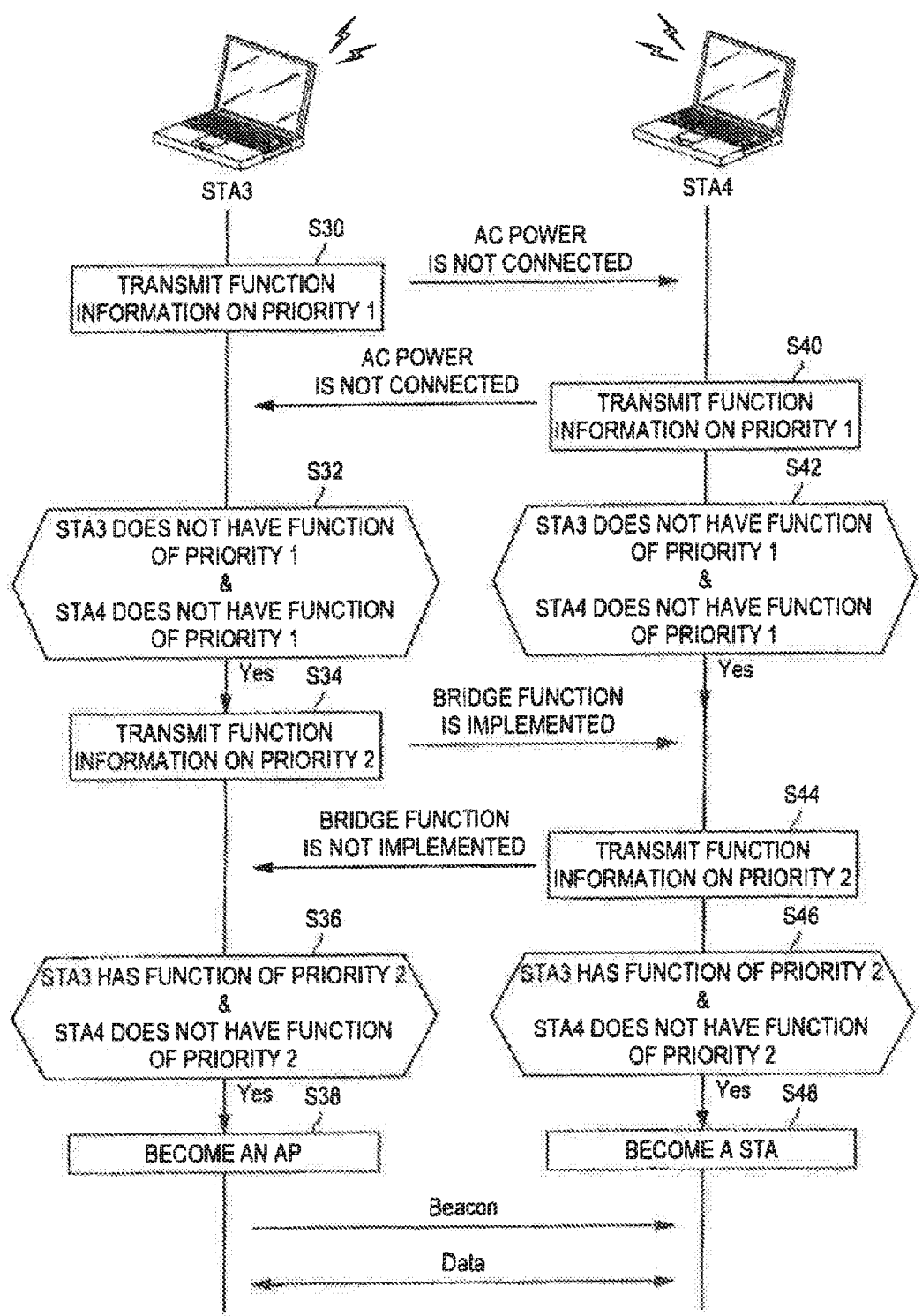
FIG. 10 is a sequence diagram showing a flow of determining, according to the priorities, which of the station 3 and the station 4 is to be an access point.

In the second embodiment, the functions of the station 3 and the station 4 are determined in order starting from 1 of the priorities shown in FIG. 9, according to each item. Which device is to be an access point is determined based on the superiority or inferiority per item. FIG. 10 is a sequence diagram showing a flow of determining, according to the priorities, which of the station 3 and the station 4 is to be an access point.

First, in step S30, the station 3 transmits function information relating to priority 1 to the station 4. Here, as shown in FIG. 9, the function information relating to priority 1 is connection/non-connection of AC power, and as shown in FIG. 8, the station 3 does not have AC power (AC power is not connected). Thus, in step S30, the station 3 transmits to the station 4 information that it does not have AC power.

Next, in step S40, the station 4 transmits the function information relating to priority 1 to the station 3. Here, as shown in FIG. 8, the station 4 does not have AC power either. Thus, in step S40, the station 4 transmits to the station 3 information that it does not have AC power.

Next, it is decided at the station 3 in step S32 that the station 3 does not have the function of priority 1 and that the station 4 also does not have the function of priority 1. In this case, which device is to be an access point is not determined based on the function of priority 1. Accordingly, the process proceeds to step S34 in this case.

Similarly, it is determined at the station 4 in step S42 that the station 3 does not have the function of priority 1 and that the station 4 also does not have the function of priority 1. In this case, which device is to be an access point is not determined based on the function of priority 1, and thus, the process proceeds to step S44.

In step 34, since which device to be an access point was not determined by the function of priority 1, the station 3 transmits to the station 4 function information relating to priority 2. Here, as shown in FIG. 9, the function information relating to priority 2 is presence or absence of a bridge function, and as shown in FIG. 8, the station 3 has the bridge function. Accordingly, in step S34, the station 3 transmits to the station 4 information that it has the bridge function.

Similarly, in step S44, the station 4 transmits to the station 3 the function information relating to priority 2. Here, as shown in FIG. 8, the station 4 does not have the bridge function, and thus, the station 4 transmits to the station 3 in step S44 information that it does not have the bridge function.

Next, it is decided at the station 3 in step S36 that the station 3 has the function of priority 2 and the station 4 does not have the function of priority 2. In this case, which device is to be an access point can be determined based on the function of priority 2. Accordingly, the station 3 is determined in step S38 to be an access point.

Similarly, it is decided at the station 4 in step S46 that the station 3 has the function of priority 2 and the station 4 does not have the function of priority 2. Accordingly, the station 4 is determined in step S48 to be a station in the infrastructure mode.

The station 3 will function as an access point after step S38, and thus, it will transmit a beacon. On the other hand, the station 4 will function as a station in the infrastructure mode after step S48, and thus, it will receive the beacon transmitted from the station 3 and will transmit data to the station 3.

Additionally, in FIG. 10, an example is shown in which an item is transmitted one by one from the parameters of functions of higher priority and comparison is made at the stations 3 and 4. However, the station 3 and the station 4 may transmit to each other all the information shown in FIG. 8 at one time, and comparison may be made in order starting from an item of high priority.

As described above, according to the second embodiment, a device showing higher suitability for an access point can be determined to be the access point by performing negotiation according to the priority of the functions of each station.

(2) Bridge Function

Next, the bridge function in each embodiment described above will be described. FIGS. 11A to 11C are schematic diagrams for describing the bridge function. In FIG. 11A, a terminal 1 is a terminal which has the bridge function. The terminal 1 is connected at the same time to both a terminal 2 and an access point. The terminal 2 and the access point can transmit/receive information by the bridge function of the terminal 1.

Similarly, in FIG. 11B, a terminal 3 is a terminal which has the bridge function. The terminal 3 is connected at the same time to both a terminal 4 and a public wireless base station. The terminal 4 and the public wireless base station can transmit/receive information by the bridge function of the terminal 3. Similarly, in FIG. 11C, a terminal 5 is a terminal which has the bridge function. The terminal 5 is connected at the same time to both a terminal 6 and a terminal 7. The terminal 6 and the terminal 7 can transmit/receive information by the bridge function of the terminal 5. As described, the bridge function is a function capable of relaying between two terminals at the time of the two terminals transmitting/receiving information.

Figure 12:
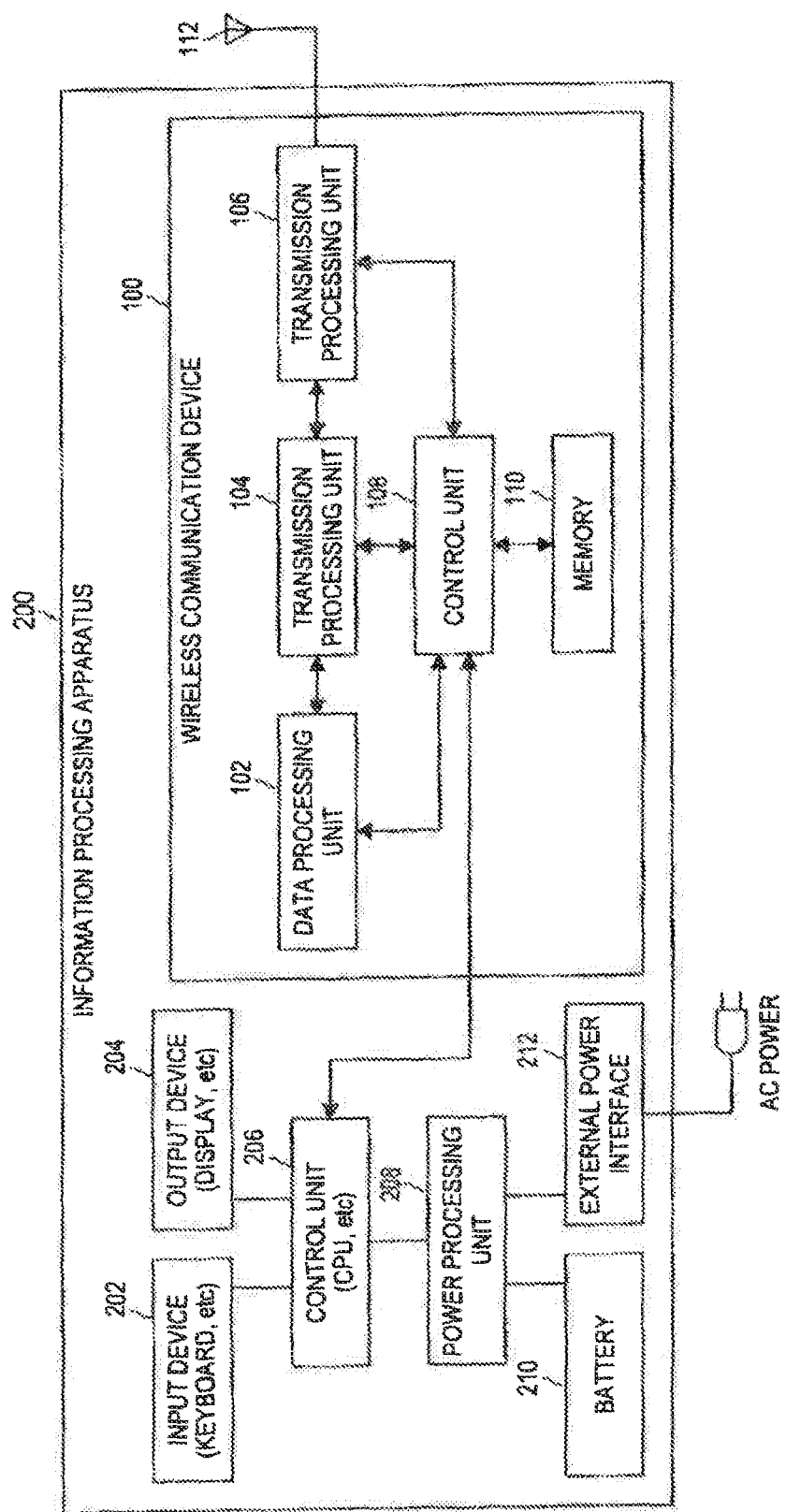
FIG. 12 is a schematic diagram showing a configuration of an information processing apparatus equipped with the wireless communication device.

(3) Configuration Example of Information Processing Apparatus with Built-in Wireless Communication Device FIG. 12 is a schematic diagram showing the configuration of an information processing apparatus 200 equipped with the wireless communication device 100. In FIG. 12, the information processing apparatus 200 is, for example, a device such as a personal computer, and the wireless communication device 100 is, for example, a device such as a wireless LAN card mounted within the personal computer. The configuration of the wireless communication device 100 is the same as that described with FIG. 1.

As shown in FIG. 12, the wireless communication device 100 is provided within the information processing apparatus 200. Furthermore, the information processing apparatus 200 includes an input device 202 such as a keyboard, an output device 204 such as a display, a control unit 206 such as a CPU, a power processing unit 208, a battery 210, and an external power interface 212. A signal from the input device 202 is input to the control unit 206. Also, the input device 202, the output device 204, and the power processing unit 208 are controlled by the control unit 206.

In this case, information such as "connection/non-connection of AC power," "remaining battery amount," "CPU processing capacity," "display provision," and "capacity of input device" described with FIG. 2 is information relating also to the information processing apparatus 200. Accordingly, the control unit 108 of the wireless communication device 100 can perceive these pieces of information relating to the information processing apparatus 200 by the control unit 206 of the information processing apparatus 200 transmitting the information to the control unit 108 of the wireless communication device 100. Also, regarding the CPU processing capacity, since the control unit 206 of the information processing apparatus 200 and the control unit 108 of the wireless communication device 100 have to perform processing in cooperation, the total of the processing capacities of the control units 108 and 206 of both sides can be taken as the "CPU processing capacity" of FIG. 2.

It should be understood by those skilled in the art that various modifications, combinations, sub-combinations and alterations may occur depending on design requirements and other factors insofar as they are within the scope of the appended claims or the equivalents thereof.

What is claimed is:

1. A first electronic device used in a wireless communication system using data defined in IEEE 802.11, the first electronic device comprising:
    circuitry configured to
        set a first value as one of numerical values 0-15 indicating a suitability for a role of the first electronic device,
        receive a second value from a second electronic device, the second value indicating one of numerical values 0-15,
        compare the first value with the second value, and
        determine whether the first electronic device operates as an electronic device transmitting a beacon or not,
    wherein the first electronic device is set as an electronic device transmitting the beacon, in response to a determination that the first value is larger than the second value, and
    wherein the first electronic device is set as an electronic device not transmitting the beacon, in response to a determination that the first value is smaller than the second value.

2. The first electronic device according to claim 1, further comprising:
    a non-transitory computer-readable medium.

3. The first electronic device according to claim 2, wherein the set first value is stored in the non-transitory computer-readable medium.

4. The first electronic device according to claim 1, wherein the first value is set based on a current state of the first electronic device.

5. A communication method, executed via at least one processor associated with a first electronic device, and using data defined in IEEE 802.11, the method comprising:
    setting a first value as one of numerical values 0-15 indicating a suitability for a role of the first electronic device;
    receiving a second value from a second electronic device, the second value indicating one of numerical values 0-15;
    comparing the first value with the second value; and
    determining whether the first electronic device operates as an electronic device transmitting a beacon or not,
    wherein the first electronic device is set as an electronic device transmitting the beacon, in response to a determination that the first value is larger than the second value, and
    wherein the first electronic device is set as an electronic device not transmitting the beacon, in response to a determination that the first value is smaller than the second value.

6. The communication method according to claim 5, wherein the first value is set based on a current state of the first electronic device.

7. A non-transitory computer-readable medium having embodied thereon a program, which when executed by a processor associated with a first electronic device causes the electronic device to execute a communication method using data defined in IEEE 802.11, the method comprising:
    setting a first value as one of numerical values 0-15 indicating a suitability for a role of the first electronic device;
    receiving a second value from a second electronic device, the second value indicating one of numerical values 0-15;
    comparing the first value with the second value; and
    determining whether the first electronic device operates as an electronic device transmitting a beacon or not,
    wherein the first electronic device is set as an electronic device transmitting the beacon, in response to a determination that the first value is larger than the second value, and
    wherein the first electronic device is set as an electronic device not transmitting the beacon, in response to a determination that the first value is smaller than the second value.

8. The non-transitory computer-readable medium according to claim 7, wherein in the executed method, the first value is set based on a current state of the first electronic device.

* * * * *